US012603833B2

(12) United States Patent
Day et al.

(10) Patent No.: US 12,603,833 B2
(45) Date of Patent: Apr. 14, 2026

(54) ALLOCATING A PACKET TO A MEDIA SESSION CONTROLLER

(71) Applicant: MICROSOFT TECHNOLOGY LICENSING, LLC, Redmond, WA (US)

(72) Inventors: Robert Keith Day, Reading (GB); Andrew John Tylee, Leamington Spa (GB); Charles Richard Stedman, Cambridge (GB); Sebastian Kenelm Rex, London (GB); Christian Dominic Lund, London (GB); Matthew Gareth Peter Meredith, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 688 days.

(21) Appl. No.: 17/852,275

(22) Filed: Jun. 28, 2022

(65) Prior Publication Data

US 2023/0353486 A1     Nov. 2, 2023

(30) Foreign Application Priority Data

Apr. 28, 2022     (GB) ..................................... 2206242

(51) Int. Cl.
| | |
|---|---|
| *H04L 45/24* | (2022.01) |
| *H04L 9/40* | (2022.01) |
| *H04L 12/46* | (2006.01) |
| *H04L 69/164* | (2022.01) |
| *H04L 69/22* | (2022.01) |

(52) U.S. Cl.
CPC .......... *H04L 45/24* (2013.01); *H04L 12/4641* (2013.01); *H04L 63/0236* (2013.01); *H04L 69/164* (2013.01); *H04L 69/22* (2013.01)

(58) Field of Classification Search
CPC . H04L 45/24; H04L 12/4641; H04L 63/0236; H04L 69/164; H04L 69/22; H04L 12/4604; H04L 12/4633; H04L 2012/4629
See application file for complete search history.

(56) References Cited

U.S. PATENT DOCUMENTS

| | | | | |
|---|---|---|---|---|
| 11,252,129 B2 * | 2/2022 | Xu | ........................... | H04L 45/66 |
| 2010/0036903 A1 * | 2/2010 | Ahmad | ................... | G06F 9/505 |
| | | | | 709/202 |
| 2013/0318345 A1 * | 11/2013 | Hengeveld | .......... | H04L 12/4633 |
| | | | | 713/168 |

(Continued)

OTHER PUBLICATIONS

"International Search Report and Written Opinion issued in PCT Application No. PCT/US2023/014191", Mailed Date: May 10, 2023, 16 Pages.

*Primary Examiner* — Thinh D Tran
(74) *Attorney, Agent, or Firm* — Han Gim; Newport IP, LLC

(57) ABSTRACT

A network device comprising: a processor; and a memory comprising instructions which when executed by the processor cause the device to allocate a packet to a Media Session Controller (MSC) by receiving the packet; inspecting a port number in the packet header of the packet; comparing the port number with one or more MSC-port allocations in a database; selecting based on the comparison an MSC from a plurality of MSCs; and forwarding the received packet to the selected MSC.

20 Claims, 8 Drawing Sheets

(56)  References Cited

U.S. PATENT DOCUMENTS

| | | | |
|---|---|---|---|
| 2014/0325637 A1* | 10/2014 | Zhang | H04L 63/0272 |
| | | | 726/15 |
| 2017/0026294 A1* | 1/2017 | Basavaraja | H04L 69/22 |
| 2017/0223154 A1* | 8/2017 | Hammam | H04L 45/60 |
| 2021/0120076 A1* | 4/2021 | Sun | H04L 12/4641 |
| 2022/0217016 A1* | 7/2022 | Liang | H04L 12/4633 |

* cited by examiner

100

102

RECEIVING A PACKET

104

INSPECTING A PORT NUMBER
IN THE PACKET HEADER

106 COMPARING THE PORT
NUMBER WITH A MSC-PORT
ALLOCATION IN A DATABASE

108

SELECTING AN MSC BASED
ON THE COMPARISON

110

FORWARDING THE PACKET
TO THE SELECTED MSC

700

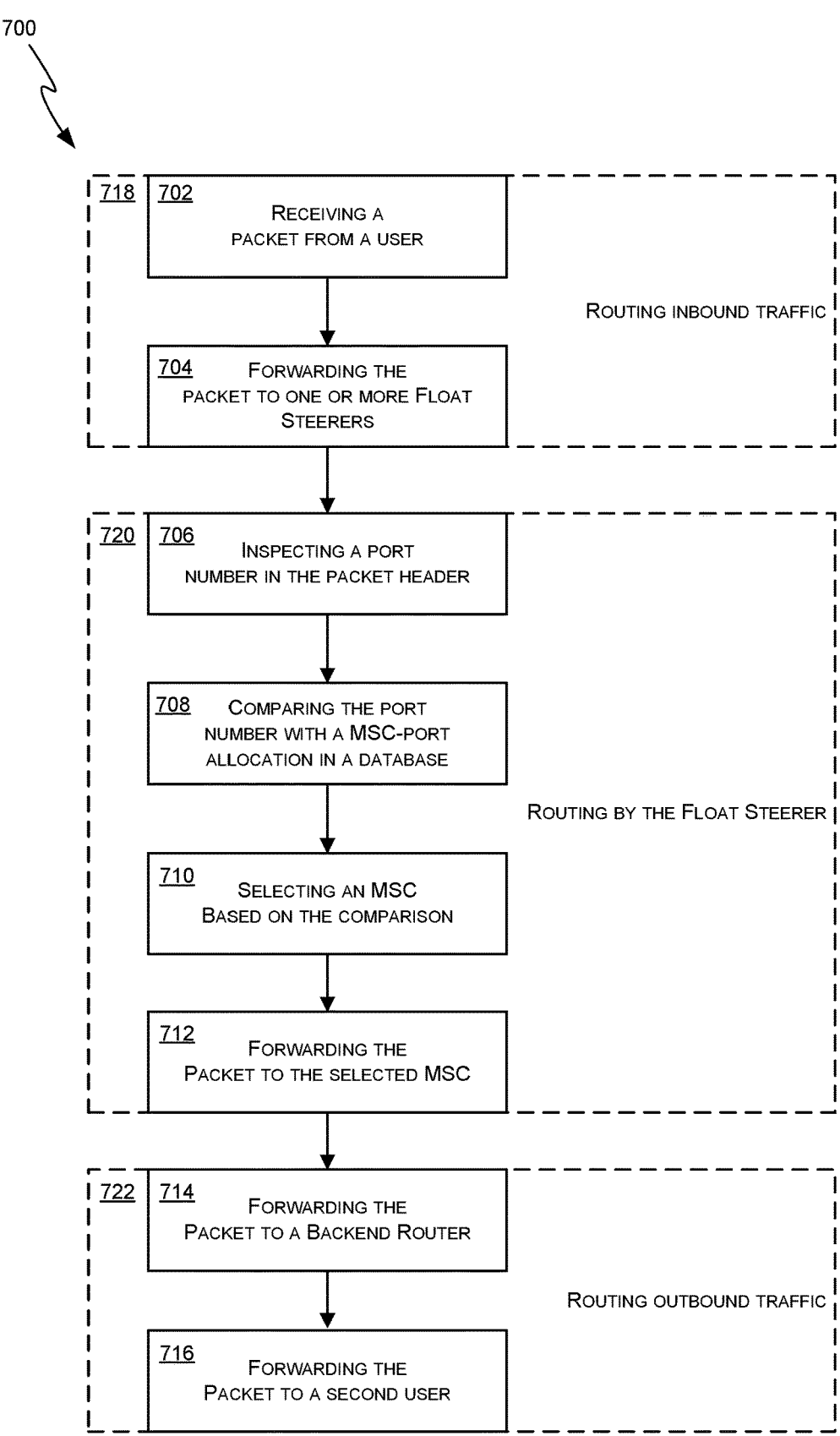

718

702

RECEIVING A
PACKET FROM A USER

704    FORWARDING THE
PACKET TO ONE OR MORE FLOAT
STEERERS

ROUTING INBOUND TRAFFIC 720    706
INSPECTING A PORT
NUMBER IN THE PACKET HEADER

708    COMPARING THE PORT
NUMBER WITH A MSC-PORT
ALLOCATION IN A DATABASE

ROUTING BY THE FLOAT STEERER

710
SELECTING AN MSC
BASED ON THE COMPARISON

712
FORWARDING THE
PACKET TO THE SELECTED MSC 722    714
FORWARDING THE
PACKET TO A BACKEND ROUTER

ROUTING OUTBOUND TRAFFIC

716
FORWARDING THE
PACKET TO A SECOND USER

ALLOCATING A PACKET TO A MEDIA SESSION CONTROLLER

CROSS-REFERENCE TO RELATED APPLICATION(S)

This non-provisional utility application claims priority to GB patent application number 2206242.6 entitled "ALLOCATING A PACKET TO A MEDIA SESSION CONTROLLER" and filed on Apr. 28, 2022, which is incorporated herein in its entirety by reference.

BACKGROUND

Modern communication sessions such as VOIP and video conferencing bring new demands for existing networks. For example, a communication session between two users requires reliable and low latency transmission of flows of packets. The difficulty for existing networks to cope with communication session flows is further increased by the highly variable demands on network resources over time and even over the course of a session.

One way of coping with this problem is to scale network resources allocated for communication sessions up or down to satisfy the varying demands. Traditionally scaling has been accomplished by adding extra Media Session Controllers, MSC, to forward packets. Adding an extra MSC means adding an extra possible network component which causes complications in routing tables, firewalls and provisioning for the communication session flows. For example, external users and routers would have to be informed of the changes to addresses when MSCs are added or removed.

The aspects and examples described below are not limited to implementations which solve any or all the disadvantages of known methods for allocating packets to media session controllers.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

According to an aspect there is provided a computer-implemented method for allocating a packet to a Media Session Controller, MSC, comprising: receiving a packet; inspecting a port number in a packet header of the packet; comparing the port number with one or more MSC-port allocations in a database; selecting, based on the comparison, an MSC from a plurality of MSCs; and forwarding the received packet to the selected MSC.

According to a second aspect there is provided a network device comprising: a processor; and a memory comprising instructions which when executed by the processor cause the device to allocate a packet to a Media Session Controller, MSC, by: receiving the packet; inspecting a port number in the packet header of the packet; comparing the port number with one or more MSC-port allocations in a database; selecting based on the comparison an MSC from a plurality of MSCs; and forwarding the received packet to the selected MSC.

According to a further aspect there is provided a system comprising: one or more network devices; one or more Media Session Controllers, MSCs, wherein each MSC, is assigned a unique range of port numbers; and a controller that prior to the packet being received at the network device, selects an MSC to receive the packet and communicates a port number associated with the selected MSC and an IP address to a user device, wherein the port number associated with the selected MSC is determined from the MSC-port allocations in the database.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 7 is a flow diagram that illustrates a method of routing packets from one user to another in a media session.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

Although the present examples are described and illustrated herein as being implemented in a media session network, the system described is provided as an example and not a limitation. As those skilled in the art will appreciate, the present examples are suitable for application in a variety of different types of networks.

Figure 1:
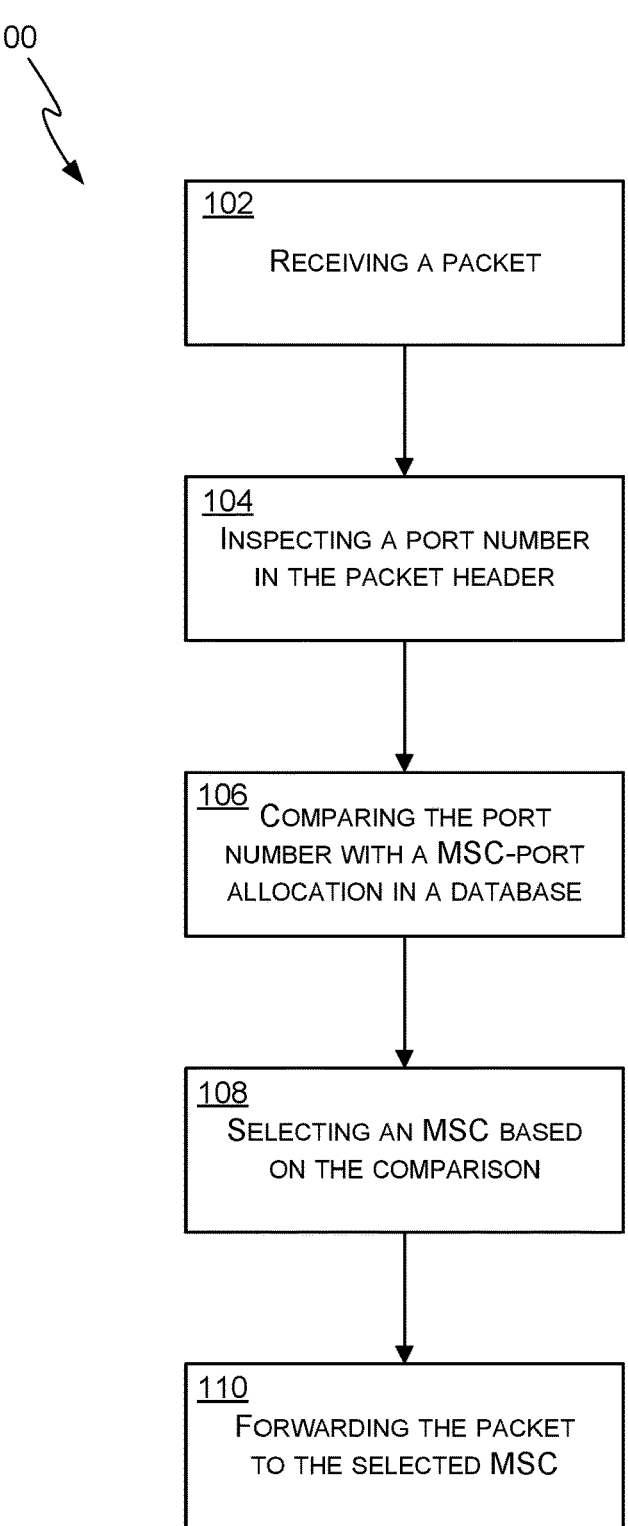
FIG. 1 is a flow diagram illustrating an exemplary method of routing a packet to a media session controller.

FIG. 1 is a flow diagram illustrating a method for routing a packet to a Media Session Controller (MSC). The packet is part of a communication session including one or more users. At 102 a packet is received at an external network interface of a network device called a Flow Steerer. The external network interface may be a wired interface such as an ethernet standard or wireless interface such as an 802.11x standard or others. Alternatively, the external network interface may be a virtual network interface. The packet may be a media packet and form part of a media traffic flow for a media session. While herein called a "packet" the packet may be a User Datagram Protocol (UDP) datagram and the media traffic flow may be a UDP media traffic flow. Alternatively, the packet may be a VXLAN encapsulated media packet.

The received packet includes a packet header comprising a port number and a destination address. The destination address may be an outward facing IP address used for all packets for a media service. Where the packet is part of the media traffic flow, the destination address and port number are common to all the packets in the same media traffic flow. The port number and the destination address are assigned for the session before the one or more users begin the session. Where the packet is a UDP datagram the port number will be a UDP destination port number, the UDP destination port number may be an unreserved UDP port number.

At 104, the Flow Steerer inspects the port number of the received packet. This involves locating a correct field in the packet header and may involve storing the port number in a temporary or other memory within the Flow Steerer.

At 106, the Flow Steerer compares the inspected port number with one or more MSC-port number allocations in a database. The database comprises allocations between one or more MSCs and port numbers, or ranges of port numbers exclusively assigned to the one or more MSCs. The database is constructed prior to the session such that each the MSC-port number allocations do not overlap. The Flow Steerer may access the database from local memory, from a connected storage device on the network, external device through an internet connection, or any other location.

The comparison comprises mapping the port number from the packet header to the allocations in the database and determining the MSC exclusively allocated to that port number. Each of the one or more MSCs in the database has an entry that may comprise an internal IP address, an MSC designation and/or other identifying information. If it is determined that no MSC is allocated for the port number in the packet header the Flow Steerer may perform a default operation. Default operations may include dropping the packet, forwarding to a default location or any other packet operation.

At 108, the Flow Steerer selects an MSC based at least on the comparison. The selection involves comparing the MSC information from the database to the one or more MSCs known to the Flow Steerer. The Flow Steerer is configured to forward packets to one or more MSCs from an internal interface. Again, the internal interface may be of any known network interface type. If the Flow Steerer does not have a known forwarding route to the MSC determined from the database, then a default operation may be carried out on the packet. The default operation again may include dropping the packet, forwarding to a default location or any other operation.

At 110, having selected an MSC the Flow Steerer prepares the packet to be forwarded at the internal interface to the MSC. Preparing the packet may comprise encapsulating the packet in a Virtual Extensible LAN "VXLAN" packet. The VXLAN packet may be configured with a VXLAN header containing the internal IP address of the selected MSC. The internal IP address may be a virtual IP address. The original packet may also have the original source and destination MAC address removed and replaced with a MAC address for the selected MSC but is otherwise preserved.

Figure 2:
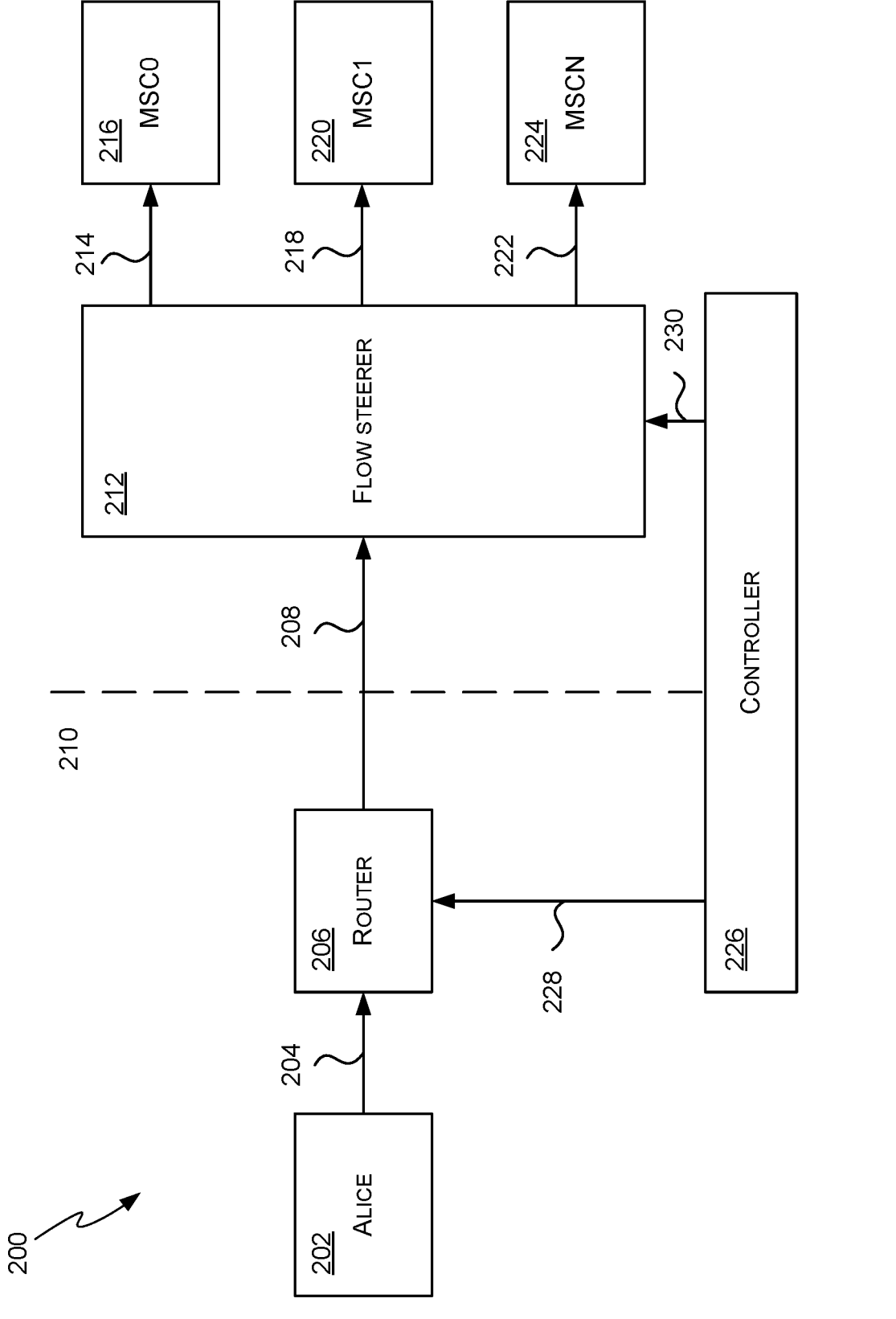
FIG. 2 is a schematic diagram illustrating an exemplary network for routing packets to a media session controller.

FIG. 2 is a schematic diagram illustrating an exemplary system 200 for routing packets to one or more media session controllers 216, 220, 224. The system comprises a user device ALICE 202 able to forward packets by a first route 204 to a router 206. The router 206 is upstream of the Flow Steerer 312. The router 206 able to forward packets by a second route 208 across a network boundary 210 to a Flow Steerer 212. The Flow Steerer able to forward packets to a first MSC 216, a second MSC 220 or an nth MSC 222 via a third route 214, a fourth route 220 and an nth route 222. A controller 226 is communicatively connected to ALICE 202, the router 206 and the Flow Steerer 212. The routes and interfaces in the system 200 may be wired such as ethernet or other standard wired connections or wireless such as 802.11x or other standard wireless connections. The controller may be a Signaling Session Controller or any other controller able to initiate a session between user devices.

Upon a request to begin a session including ALICE 202, the controller selects an MSC from one or more MSCs to handle the session. The assignment of the MSC may be based at least on performance data, an operating status, a load, or other metrics. The session may involve a flow of multiple packets. The packets may be media packets and the flow may therefore be a media traffic flow. The controller selects the same MSC to handle all the packets for the media traffic flow.

To enable the packets to be routed to the selected MSC the controller communicates to ALICE 202 to include in a packer header a port number associated with the assigned MSC during session initialization. Each MSC is assigned a unique and non-overlapping range of port numbers which is stored in a database. The database is available to the controller and the Flow Steerer. The database contains MSC-port assignments that allows conversion between any applicable port number and the MSC assigned with that port number.

The controller may comprise a working copy of the database and be able to update the MSC-port assignments based at least on the status of the MSCs. Relevant considerations may include failure of MSCs, loads and connection performance. The controller may periodically update a copy of the database in the Flow Steerer or allow the Flow Steerer to access the database stored on the controller. Alternatively, both the controller and the Flow Steerer may access an external storage location to access the database.

After the session is initiated ALICE 202 sends the packet to the connected router 206 through the first route 204. As discussed above the packet may be a media packet of a media traffic flow and therefore contain a payload of media data. The payload may be voice, video, or any other media data. The packet may be a UDP datagram of a UDP media traffic flow. ALICE 202 includes the port number and destination address received from the controller in the session initialization in the packet header. The destination address may be a shared media service IP address.

The router 206 receives the packet and inspects a destination address in the packet header. Having inspected the destination address of the packet, the router 206 consults a routing table and forwards the packet to the Flow Steerer 212 via second route 208. The Flow Steerer may be in a separate network to ALICE 202 and the router 206 as shown by the network boundary 210. The separate network may be a network of physical devices with the Flow Steerer 212 and one or more MSCs being discrete network devices. Alternatively, the separate network may be a data center or cloud network and the flow steerer and MSCs may be instantiated as virtual network devices.

On receiving the packet, the Flow Steerer 212 inspects the packet header for a port number. The port number may be stored temporarily in a local storage such as a memory within the Flow Steerer 212. Having determined the port number from the packet header the Flow Steerer 212 compares the port number to the MSC-Port allocations in the database. Using the database, the Flow Steerer 212 identifies an MSC assigned to that port number. The database may be stored locally at the Flow Steerer 212, at the controller 226 or an external location.

The Flow Steerer 212 may forward packets to multiple MSCs from an internal network interface. Having identified an MSC from the database the Flow Steerer 212 determines how to forward a packet to that MSC, for example by comparing the identified MSC to a list of IP addresses or MAC addresses. This may be performed by comparing the known internal IP addresses of the connected MSCs to an IP address or other piece of identifiable information, from the database. The Flow Steerer 212 encapsulates the packet in a VXLAN packet with the internal IP address of the selected MSC and forwards the packet through one of the first, second, or another route up to the nth route 214, 218, 222 to the first, second or another MSC up to the nth MSC 216, 220, 224.

At the MSC 216, 220, 224 the packet is unencapsulated from the VXLAN packet. The packet may then be forwarded to an external network or a second user device to complete the route. An outbound portion of the route after the MSC may be asymmetrical as the MSC may forward the packet directly to an outbound router and not back to the Flow Steerer 212 or any other Flow Steerer.

The configuration of system 200 with the Flow Steerer 212 allows a packet addressed with a single IP address designated to access a pool of MSCs. In contrast current methods require packets to be addressed to an individual IP address for each MSC. The single IP address for the pool of MSCs allows efficient scaling up and down of the MSC pool without having to update IP addresses in the upstream network. There is no need for instance to update the routing table of the router 206 based on the status of the MSCs. Updating IP addresses when adding or removing MSCs may also be inefficient because, for example, any firewalls in the upstream network would require updated whitelists.

Figure 3:
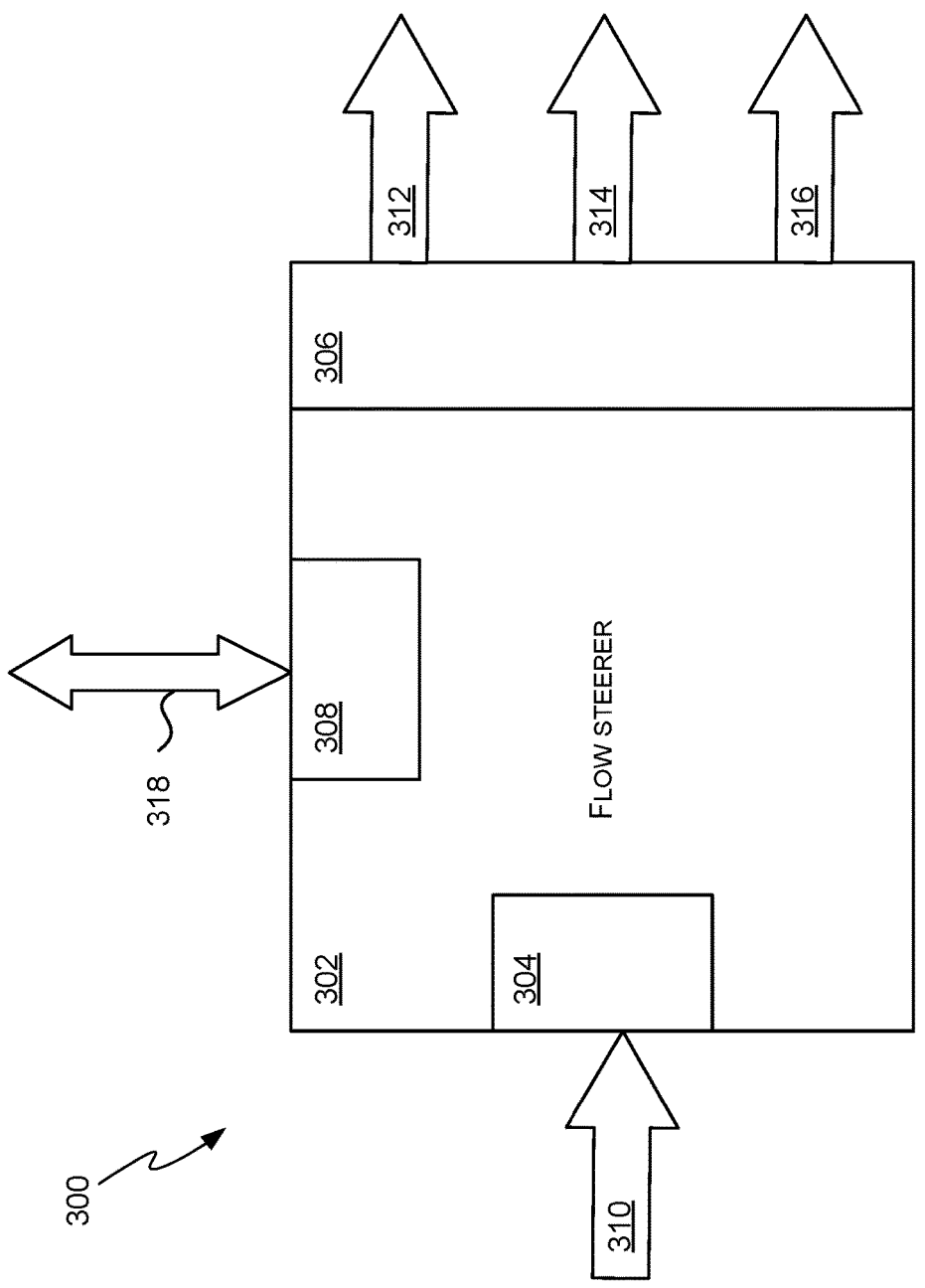
FIG. 3 is a schematic diagram of a device for routing packets to a media session controller.

FIG. 3 is a schematic diagram 300 of the Flow Steerer 302. The Flow Steerer 302 comprises three network interfaces. An external interface 304, a management interface 308 and an internal interface 306. The Flow Steerer is configured to receive incoming packet flows 310 at the external interface. The Flow Steerer is configured to receive control information and send and receive operational statistics and other operational data at the management interface 318. The Flow Steerer 302 is configured to forward the packet flows to one of one or more possible locations from the internal interface 306. The Flow Steerer may be a physical network device or a virtual network device and so the interfaces may be physical or virtual network interfaces.

The Flow Steerer 302 receives incoming packets at the external interface 304. Received packets flow from the external interface 304 to the internal interface 306 but not in the opposite direction. The internal interface 306 and external interface 304 may be configured to use IPv4, IPv6 or any other network layer protocol. The Flow Steerer 302 has a high packet throughput of around 3.7 million packets per second. The internal interface 306 is configured to forward the received packet to one of a pool of destinations 312, 314, 316.

The Flow Steerer 302 is configured to provide alerts and metrics at the management interface 318. The alerts include alerts indicating dropped packets, load threshold or any other relevant alerts. The metrics include health and performance statistics for the Flow Steerer 302 such as packets per second data and other relevant metrics.

The management interface 308 is an input/output interface as it also allows access to the database in the Flow Steerer 302. As discussed above, the database comprises MSC-port number allocations. The Flow Steerer 302 uses the database to forward the received packets to the assigned MSC based at least on the port number in the packet header. The database may be updated periodically by the controller or other external management entity through the management interface 318 to respond to changes in the MSC-Port allocation for the system. An example scenario where this may be needed is a change of address for an MSC, or a failure in an MSC that requires the port numbers to be reassigned to another MSC.

The Flow Steerer 302 may keep logs of activity including the alerts and metrics discussed above in a local memory. These logs may also be accessed through the management interface 318 by the controller or another management entity. The logs may be downloaded from the Flow Steerer 302 through the management interface 318 using Secure File Transfer Protocol or other secure protocols. Optionally a display and input device may allow an operator to view and edit the logs of the Flow Steerer.

Figure 4:
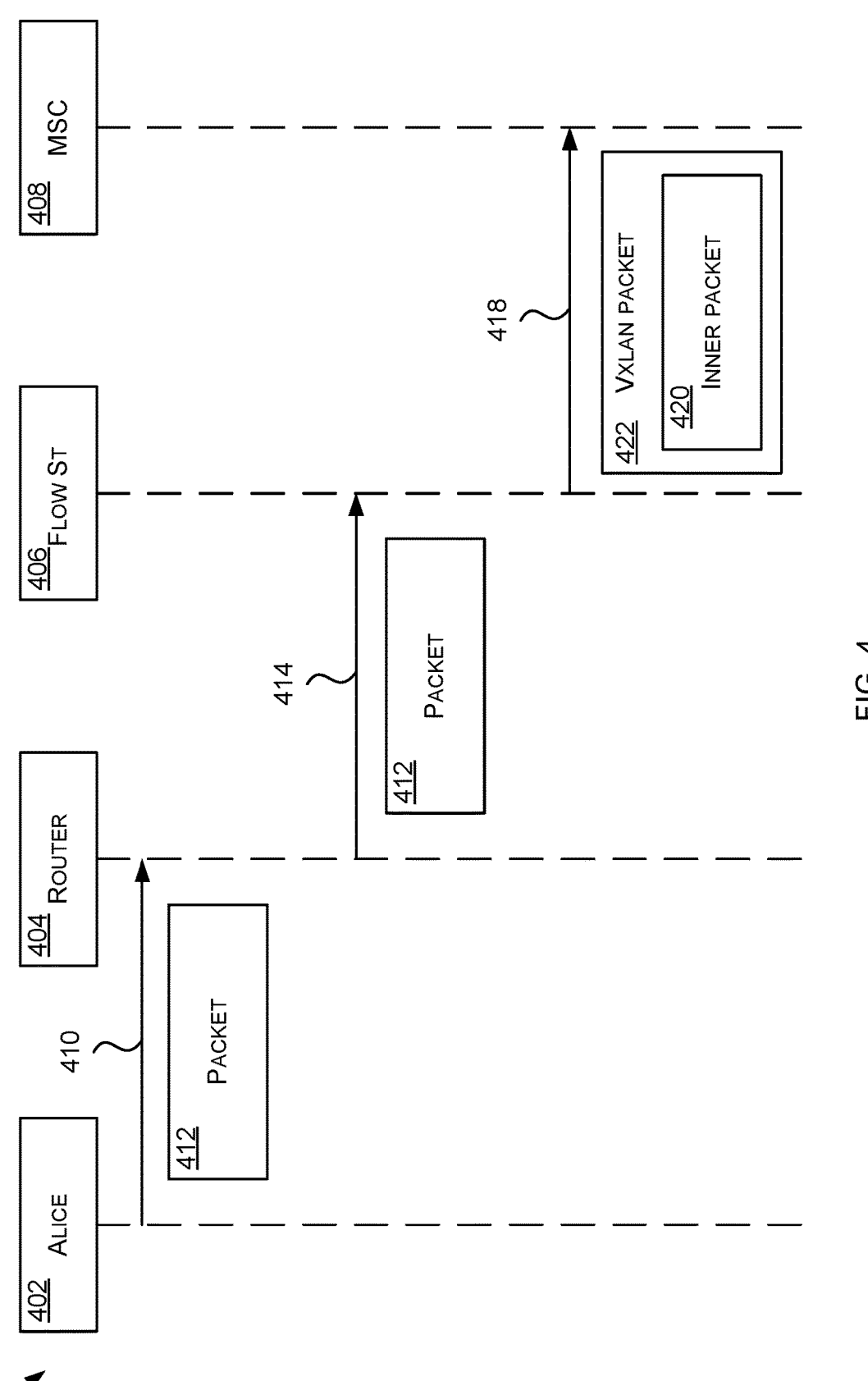
FIG. 4 is a flow diagram showing packet progress from a user to a media session controller.

FIG. 4 is a data flow diagram between a user ALICE 402 and an MSC 408. ALICE 402 generates a packet 412 as part of a session. The packet contains a port number in a packet header. The port number may be predetermined by a controller as part of the call setup process as discussed above. The packet may contain a payload of media data such as VOIP call data or other streaming data to be handled by the MSC. As discussed above, the packet may be a UDP datagram and form part of a UDP media traffic flow.

Through route 410, ALICE forwards the packet 412 to a known router 404. The router may be a local router to ALICE 402 and/or may be known as an upstream destination for handling media traffic. The packet may be forwarded by ALICE 410 to the router 404 over a route defined by any routing protocol.

The router 404 is preconfigured by the controller to forward the packet based on the destination address in the packet header. The router 404 may be configured to route all media packets to the destination address according to a routing table. The destination address and routing table is used to route packets in a multi-path route that comprises a network device such as 300 called a Flow Steerer 406. This means that through route 414 the router 404 forwards the packet to the Flow Steerer 406.

As discussed above the Flow Steerer 406 inspects the packet for the port number contained in the packet header. To route the packet 416 to the MSC 408 the Flow Steerer selects the MSC using the port number in the packet header, encapsulates the packet in a VXLAN packet, and forwards the packet to the selected MSC.

The MSC is selected according to the MSC-Port allocations in the database. As discussed above the database maps the port numbers to MSC identity information. The Flow Steerer may then use the MSC identity information associated with the port number of the packet header to select the MSC 408 for forwarding the packet 416. The database is deterministic such that packets arriving with the same port number will be routed to the same MSC. The database also maps MSCs to a unique range of one or more port numbers.

It is desirable that the MSC 408 and any further network locations receive the packet in its original form. To achieve this while enabling routing to the MSC 408, the Flow Steerer 406 encapsulates the packet 416 as an inner packet 420 in a VXLAN packet 422. The VXLAN packet 422 contains a VXLAN packet header comprising an IP address for the selected MSC. The IP address for the MSC may be an internal and/or virtual IP address. Along with the inner packet 420 an entire ethernet frame of the packet 416 may be encapsulated in the VXLAN packet.

Encapsulating in the VXLAN packet has the additional advantage that the network does not require special configuration. The VXLAN packet 422 is a UDP packet with specially assigned UDP port 4789. Therefore, any routers and switches between the Flow Steerer 406 and the MSC 408 handle the VXLAN packet 422 as they would for any other UDP packet. Once encapsulated the Flow Steerer forwards the VXLAN packet 422 with the encapsulated inner packet 420 to the MSC 408.

At the MSC the VXLAN packet 422 is unencapsulated and the inner packet 420 retrieved. The inner packet contains the original source and destination address of the packet 412 and the data. The MSC 408 may then handle forwarding the packet to an ultimate destination. The route is asymmetrical meaning that packets in the session addressed to ALICE 402 do not flow in the opposite direction of FIG. 4, i.e., from the MSC 408 to the Flow Steerer 406. Instead, all packets for the session in either direction are received at the Flow Steerer 406.

Figure 5:
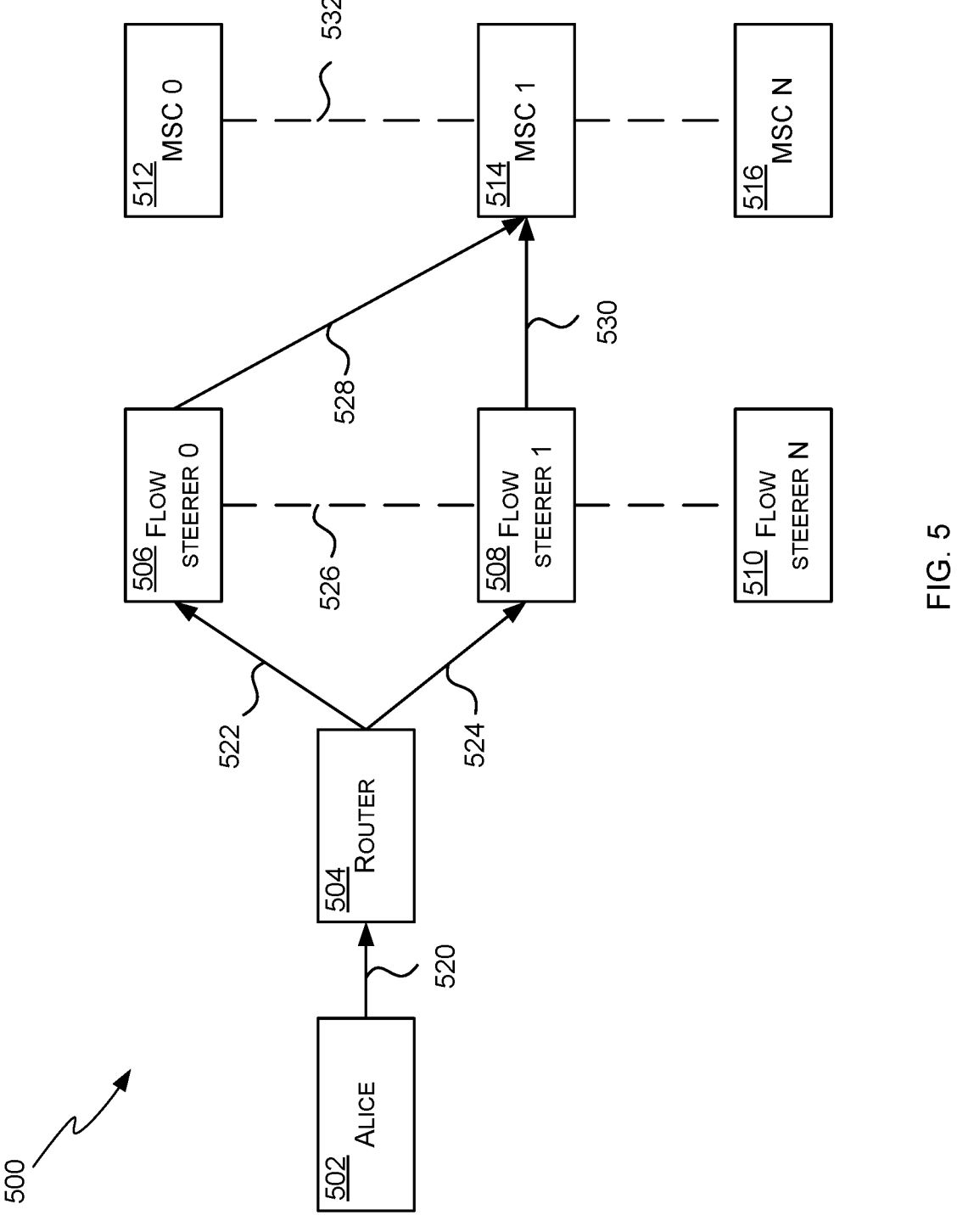
FIG. 5 is a schematic diagram showing a method of routing packets of a media session flow.

FIG. 5 shows a schematic diagram of a system for forwarding packets in a session through a pool of Flow Steerers 526. FIG. 5 differs to the configuration shown in FIG. 2 in that it contains a pool of Flow Steerers 530 containing for example a first Flow Steerer 506, a second Flow Steerer 508 up to an nth Flow Steerer 510. In some examples the pool of Flow Steerers 526 are deployed as a pool of Virtual Machine instances VMs. Deploying the pool of Flow Steerers 526 allows for increased capacity and redundancy of operation. Each Flow Steerer in the pool of Flow Steerers 526 may forward packets to any MSC in the pool of MSCs 530.

The pool of Flow Steerers 526 may be deployed as a pool of N+k VM instances. In such a deployment the pool may handle up to N instance's worth of packet traffic and may handle a loss of up to k Flow Steerers before service deteriorates. The pool of Flow Steerers 526 may be deployed in an active-active configuration meaning that there are no passive backup Flow Steerers and instead each Flow Steerer in the pool of Flow Steerers 526 receives incoming packets.

The router 504 is configured to consider each of the Flow Steerers in the pool of Flow Steerers as possible routes for the packet. This may be provided by a statically configured Equal Cost Multi-Path Protocol, ECMP, or other multipath routing protocol. In such a configuration each route to the destination address of the packet is routed to a separate Flow Steerer in the pool 526. The multi-path routing means that in the event of a failure of one of the Flow Steerers in the pool of Flow Steerers 526 the packets are sent via another route to a different Flow Steerer. ECMP has the additional advantage that the routes are equal cost and therefore the packets are distributed equally amongst the Flow Steerers in the pool of Flow Steerers 526.

Each Flow Steerer in the pool of Flow Steerers 526 is configured to route packets to the MSC 514 in the pool of MSCs 532 using the same MSC-port allocations in the database. As discussed above the database is deterministic. This means a packet with a same port number in the packet header arriving at any Flow Steerer in the pool 526 is forwarded to the same MSC.

In the example of FIG. 5 a user device ALICE 502 forwards the packet to the router 504 through the route 520. The route 520 may be a single hop and the router 504 may be a local router, or a multi-hop route using a known routing protocol. As discussed above, the packet may be a media packet for a media traffic flow such as a VOIP session or other media traffic. The router 504 is configured to route the packet to a Flow Steerer of the pool of Flow Steerers 526 based at least on a routing protocol. As discussed above, the router 504 may use ECMP. The protocol may determine the packet is forwarded to a zeroth Flow Steerer through a first Flow Steerer route 522. In some cases, to achieve more equal distribution or where the zeroth Flow Steerer 506 has failed or for any other reason the packet is forwarded to the first Flow Steerer 508. Based at least on similar considerations, the packet may be routed to any other Flow Steerer in the pool of Flow Steerers 526. The router 504 may poll each Flow Steerer of the pool of Flow Steerers 526 to update the multi-path routes stored in a routing table in the router 504.

As discussed above, when the packet is received by the zeroth Flow Steerer 506, the port number packet is inspected and using the database the zeroth Flow Steerer 506 determines to which MSC of the pool of MSCs 532 to forward the packet. In the example of the system 500, the packet is forwarded to a first MSC 514. In the case where the packet arrives at the first Flow Steerer 508 or any other Flow Steerer in the pool of Flow Steerers 526 the same process is carried out. Specifically, the same inspection of the port number of the packet and the same determination of the forwarding MSC is performed based at least on the same database. This means that each Flow Steerer in the pool of Flow Steerers 526 will make the same forwarding decision for a same received packet. As discussed above, the forwarding decision may result in a default operation being performed where either the port number is not allocated to an MSC in the database or the allocated MSC does not have a forwarding route stored in the Flow Steerer. Otherwise, each Flow Steerer would forward the packet to the same MSC.

In the example of the system 500, where the packet arrives at the zeroth Flow Steerer 506 and the scenario where the packet arrives at the first Flow Steerer 508 both result in the same forwarding decision. In both cases the packet is forwarded to the first MSC 514 via route 528 from the zeroth Flow Steerer or route 530 via the first Flow Steerer 508. This means that the forwarding decisions are independent of the receiving Flow Steerer allowing for all packets of a media traffic flow to be routed to a same MSC but through different Flow Steerers in the pool of Flow Steerers 526. This allows for efficient scaling and redundancy of the pool of Flow Steerers 526. As discussed above, before forwarding the packet the Flow Steerer encapsulates the packet as an inner packet in a VXLAN packet. The encapsulation also occurs in the scenario where the packet is received at any Flow Steerer in the pool of Flow Steerers 526.

As discussed above, at the first MSC 514 the inner original packet is unencapsulated from the VXLAN packet. The MSC then routes the packet to its destination.

Figure 6:
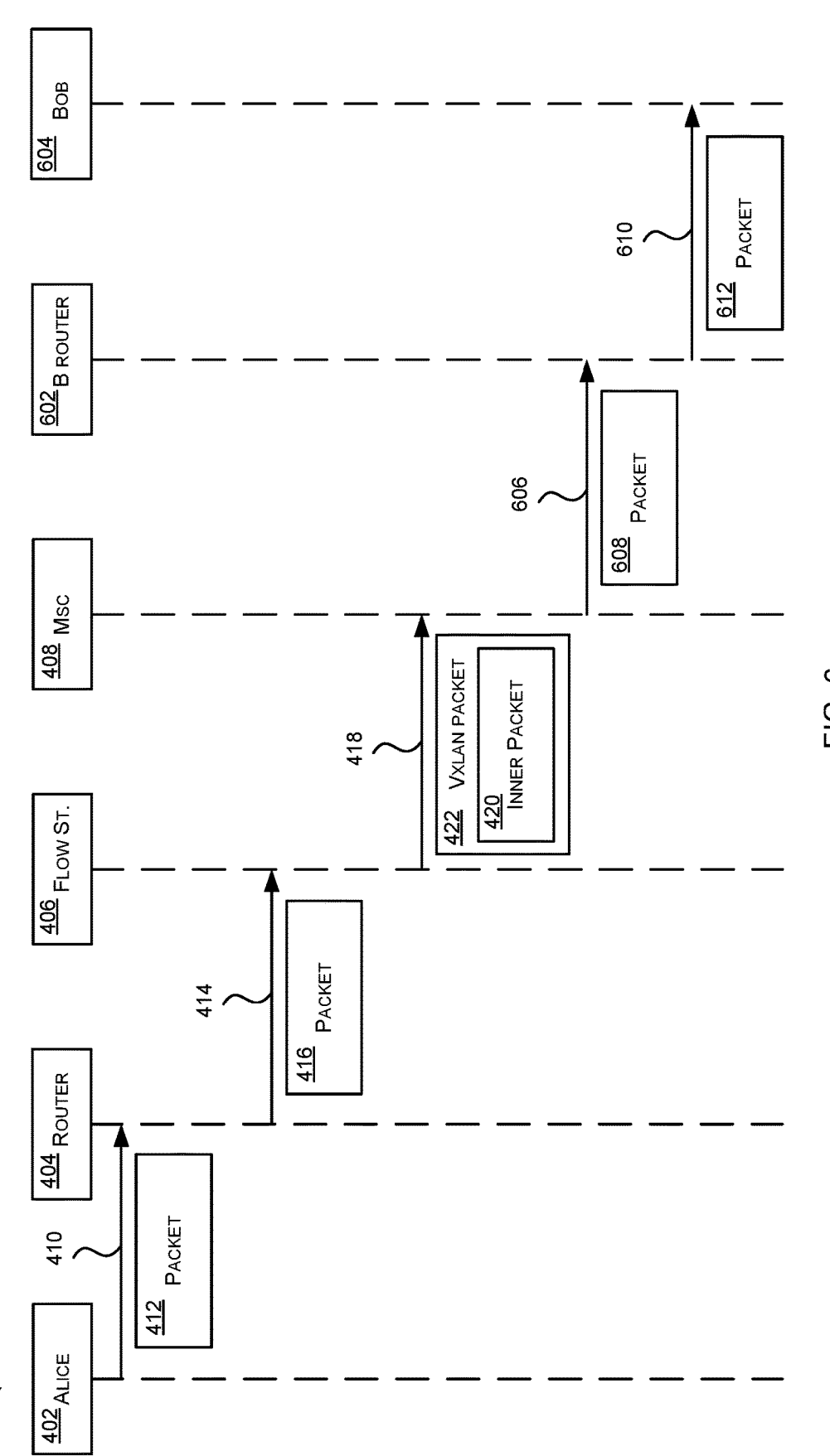
FIG. 6 is a flow diagram showing packet routing in a media session from one user to another.

FIG. 6 expands upon FIG. 4 to show the complete data flow 600 between two users. In addition to FIG. 4, in FIG. 6 there is a backend router 602 and a user device BOB 604. At the MSC 408 the inner packet 420 is unencapsulated from the VXLAN packet 422. The inner packet containing a same packet header and payload as the originally sent packet 412. The payload may be a media payload such as voice or video data to be communicated to BOB 604 in the session.

Having retrieved the packet, the MSC 604 determines that the packet is destined for BOB 604. This may be based at least on information in the packet payload or the packet header and determined during the session setup process.

Having determined the packet is destined for BOB 604, the MSC updates the destination address of the packet from the address of the Flow Steerer to a known IP address for BOB 604 and forwards the packet 606 to the backend router 602. In some examples, outbound packets from the MSC 408 are sent directly to the backend router 602 in this way without passing back through the Flow Steerer 406 or any other Flow Steerer. This is an example of Direct Server Return and reduces the load on the pool of Flow Steerers 406. In alternative examples, the packet outbound packets do return through the Flow Steerer 406 or another Flow Steerer; although this increases load at the Flow Steerers it reduces network complexity as there is symmetrical routing. At the backend router 602 the packet is forwarded to the destination BOB 604. A determined route 610 may comprise several hops.

In the session a return packet may be sent from BOB 604 back to ALICE 402. The return packet does not traverse through the system in the opposite direction as the previous packet i.e., from BOB 604 back to the first MSC 408. Instead, return packets are also sent to the Flow Steerer 406 in the same way.

FIG. 7 is a flow diagram expanding on the flow diagram of FIG. 1 to illustrate a method of forwarding a packet from a user to a second user. The diagram 700 is divided into three sections. A first section 718 describes the process of routing inbound traffic to a Flow Steerer. A second section 100 is equivalent to the method described in FIG. 1 with step 102 omitted for brevity and describes a method for routing packets by the Flow Steerer. A third section 722 describes an example method for routing outbound traffic from the Flow Steerer.

At 702, a packet is received at a router from a user. The packet may be a media packet and may form part of a media traffic flow. While called "packet", the packet may also be a UDP datagram and form part of a UDP media traffic flow. The packet comprises a destination address and a port number. As described above the destination address may be an IP address.

At 704, the user forwards the packet based at least on a selected route for the destination address from the routing table. The router may comprise a routing table that is configured with one or more multi-path routes for the destination address. Each multi-path route for the destination address configured to route the packet to a Flow Steerer. As discussed above a multi-path routing protocol such as ECMP may be used by the router, which has the additional advantage of evenly distributing the packets across the routes.

The packet is received by the Flow Steerer where it performs the method steps as described in FIG. 1.

At 714, the packet is received by the selected MSC. The received packet is encapsulated in a VXLAN packet and so is unencapsulated. This is accomplished by removing the VXLAN header from the packet. Once unencapsulated, the packet is inspected to determine an ultimate destination for the packet. This determination may be accomplished in any known manner such as inspecting user information in the payload or packet header. Once the ultimate destination is determined the destination address of the packet is updated to the address of a second user in the session and the packet is forwarded to a backend router. The MSC does not have to forward packets to the Flow Steerer.

At the backend router the updated destination address is inspected and the packet is forwarded towards the second user.

Figure 8:
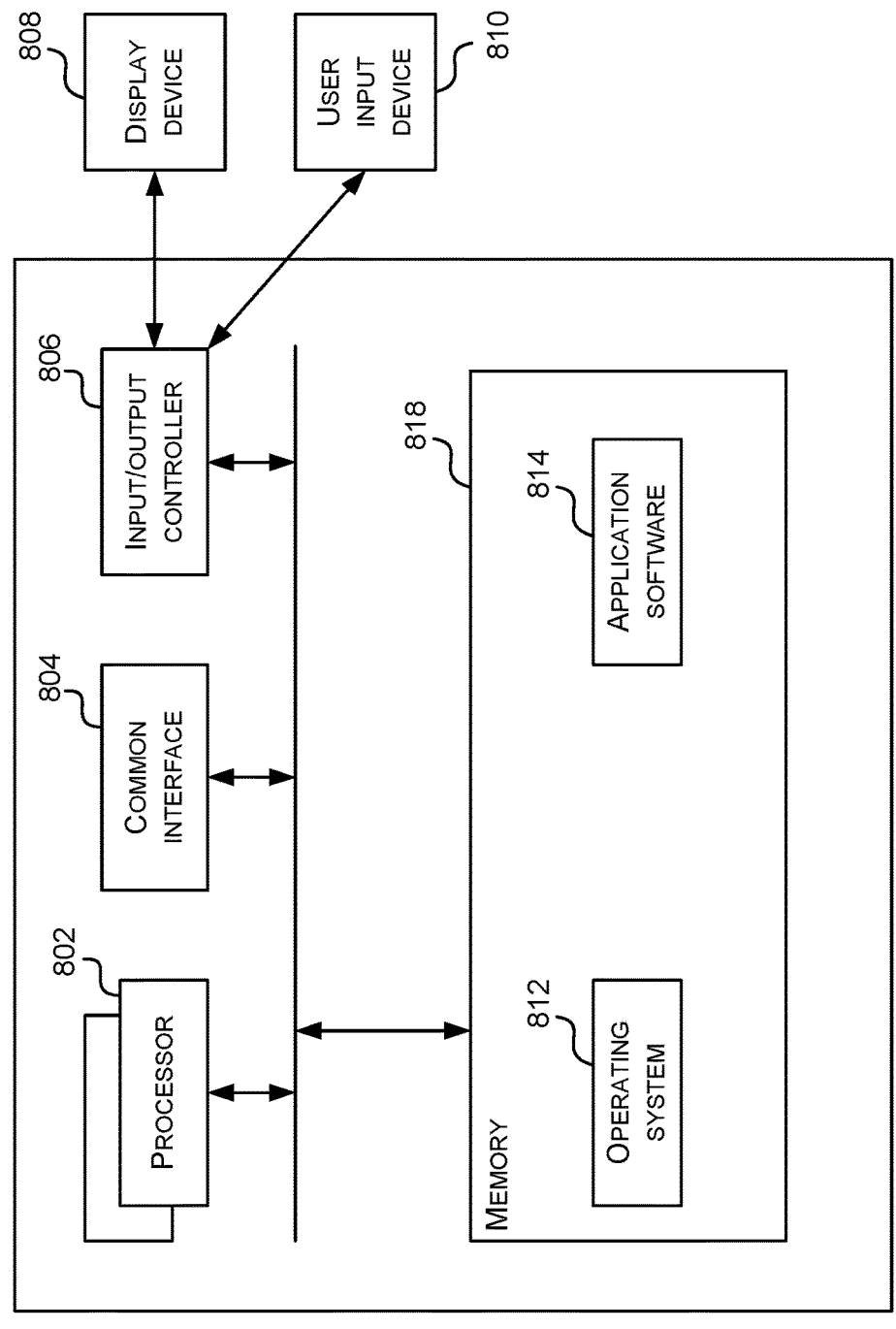
FIG. 8 illustrates an exemplary computing-based device in which other examples of the disclosure may be implemented.

FIG. 8 illustrates various components of an exemplary computing-based network device which are implemented as any form of a computing and/or electronic device, and in which any of the above examples are implemented.

Computing-based device 800 comprises one or more processors 802 which are microprocessors, controllers, or any other suitable type of processors for processing computer executable instructions to control the operation of the device to implement the examples described above. Platform software comprising an operating system, or any other suitable platform software is provided at the computing-based device to enable application software to be executed on the device.

Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The computer executable instructions are provided using any computer-readable media that is accessible by computing based device 800. Computer-readable media includes, for example, computer storage media such as memory 818 and communications media. Computer storage media, such as memory 818, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 818) is shown within the computing-based device 800 it will be appreciated that the storage is, in some examples, distributed or located remotely and accessed via a network or other communication link (e.g. using communication interface 804).

The computing-based device 800 also comprises an input/output controller 806 arranged to output display information to a display device 808 which may be separate from or integral to the computing-based device 800. The display information may provide a graphical user interface to display the alerts, metrics and logs described above. The input/output controller 806 is also arranged to receive and process input from one or more devices, such as a user input device 810 (e.g. a mouse, keyboard, camera, microphone or other sensor). In some examples the user input device 810 detects voice input, user gestures or other user actions and provides a natural user interface (NUI). This user input may be used to update the database or any other configurations for the computing device 800. In an example the display device 808 also acts as the user input device 810 if it is a touch sensitive display device. The input/output controller 806 outputs data to devices other than the display device in some examples, e.g. a locally connected printing device (not shown in FIG. 8).

Any of the input/output controller 806, display device 808 and the user input device 810 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

EXAMPLES

Example 1. A computer-implemented method for allocating a packet to a Media Session Controller, MSC, comprising: receiving a packet; inspecting a port number in a packet header of the packet; comparing the port number with one or more MSC-port allocations in a database; selecting, based on the comparison, an MSC from a plurality of MSCs; and forwarding the received packet to the selected MSC.

Example 2. The computer-implemented method according to example 1, wherein the packet is received at an external network interface and from an upstream router.

Example. The computer-implemented method according to example 1 or example 2, wherein the port number is a UDP destination port number.

Example 4. The computer-implemented method according to any preceding example, wherein the selecting, based on the comparison, further comprises: mapping the port number to a virtual IP address of the selected MSC from the database; and forwarding the received packet to the selected MSC comprises forwarding the packet to the virtual IP address.

Example 5. The computer-implemented method according to any preceding example, wherein forwarding the received packet to the selected MSC further comprises encapsulating the packet in a Virtual Extensible LAN, VXLAN, packet.

Example 6. The computer-implemented method according to example 5, wherein encapsulating the packet in the VXLAN packet further comprises: overwriting the destination MAC address in an ethernet header of the packet with a MAC address of the selected MSC.

Example 7. The computer-implemented method according to any preceding example, wherein the received packet is a media packet of a media traffic flow.

Example 8. The computer-implemented method according to any preceding example, wherein the MSC-port allocations in the database associate each MSC with a unique media port number or a unique range of media port numbers.

Example 9. The computer-implemented method according to any preceding example, wherein the database is updated through a management interface.

Example 10. The computer-implemented method according to any preceding example, wherein the packet is forwarded to the selected MSC through a virtual network interface.

Example 11. A network device comprising: a processor; and a memory comprising instructions which when executed by the processor cause the device to allocate a packet to a Media Session Controller, MSC, by: receiving the packet; inspecting a port number in the packet header of the packet; comparing the port number with one or more MSC-port allocations in a database; selecting based on the comparison an MSC from a plurality of MSCs; and forwarding the received packet to the selected MSC.

Example 12. The network device according to example 11 further comprising an external network interface, wherein the packet is received at the external network interface and from an upstream router.

Example 13. The network device according to examples 11 to 12, wherein the port number is a UDP destination port number.

Example 14. The network device according to examples 11 to 13, wherein the selecting based on the comparison further comprises: mapping the port number to a virtual IP address of the selected MSC from the database; and forwarding the packet to the selected MSC comprises forwarding the packet to the virtual IP address.

Example 15. The network device according to any of examples 11 to 14 wherein forwarding the received packet to the selected MSC further comprises encapsulating the packet in a Virtual Extensible LAN, VXLAN, packet.

Example 16. The network device according to example 15 wherein encapsulating the packet in the VXLAN packet further comprises: overwriting the destination MAC address in an ethernet header of the packet with a MAC address of the selected MSC.

Example 17. The network device according to any of examples 11 to 16 wherein the received packet is a media packet of a media traffic flow.

Example 18. The network device according to any of examples 11 to 17 wherein the MSC-port allocations in the database associate each MSC with a unique media port number or a unique range of media port numbers.

Example 19. The network device according to any of examples 11 to 18 further comprising a management interface, and wherein the database is updated through the management interface.

Example 20. The network device according to any of examples 11 to 19 further comprising an internal network interface, and wherein the packet is forwarded to the selected MSC through the internal network interface.

Example 21. A system comprising: one or more network devices according to any of examples 11 to 20; one or more Media Session Controllers, MSCs, wherein each MSC, is assigned a unique range of port numbers; and a controller (226) that prior to the packet being received at the network device selects an MSC to receive the packet and communicates a port number associated with the selected MSC and an IP address to a user device, wherein the port number associated with the selected MSC is determined from the MSC-port allocations in the database.

Example 22. The system according to example 21 further comprising a router which receives the packet from the user device and forwards the packet to a network device of the one or more network devices.

Example 23. The system according to example 22 wherein the router uses Equal Cost Multipath Routing, ECMP, to route the packet to one of the one or more network devices.

Example 24. The system according to example any of examples 21-23 wherein the MSC is selected based at least one or more of performance data, an operating status, and a load.

Example 25. The system according to any of examples 21-24 wherein the packet forms part of a media session flow and the same MSC is selected for all packets in the same media session flow.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g., in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of examples. Although various examples have been described above with a certain degree of particularity, or with reference to one or more individual examples, those skilled in the art could make numerous alterations to the disclosed examples without departing from the scope of this specification.

What is claimed is:

1. A computer-implemented method for allocating a packet to a Media Session Controller (MSC) of a communications network, the method comprising:

receiving a media packet for a media session;

prior to starting the media session, selecting, in accordance with a database, which of a plurality of MSCs will handle the media packet based on current loads, wherein the database contains unique and exclusive UDP ranges of port number allocations for each of the plurality of MSCs;

updating the database to indicate the selection, wherein the updating is performed periodically to respond to changes in MSC port-allocations;

inspecting a UDP port number in a header of the media packet;

comparing the port number with MSC-port allocations in the database;

selecting, based on the comparison, an MSC from the plurality of MSCs;

forwarding the media packet to the selected MSC;

updating, by the selected MSC, a destination address of the media packet to a known IP address for the destination address; and forwarding, by the selected MSC, the media packet to a backend router.

2. The computer-implemented method according to claim 1, wherein the selecting, based on the comparison, further comprises:

mapping the port number to a virtual IP address of the selected MSC from the database; wherein forwarding the packet to the selected MSC comprises forwarding the packet to the virtual IP address of the selected MSC.

3. The computer-implemented method according to claim 1, wherein forwarding the packet to the selected MSC further comprises encapsulating the packet in a Virtual Extensible LAN (VXLAN) packet.

4. The computer-implemented method according to claim 1, wherein the MSC-port allocations in the database associate each MSC with a unique range of media port numbers.

5. The computer-implemented method according to claim 1, wherein the packet is forwarded to the selected MSC through a virtual network interface.

6. A network device comprising:

a processor; and a memory comprising instructions which when executed by the processor cause the network device to perform operations for allocating a packet to a Media Session Controller (MSC), the operations comprising:

receiving a media packet for a media session;

prior to starting the media session, selecting, in accordance with a database, which of a plurality of MSCs will handle the media packet based on current loads, wherein the database contains unique and exclusive UDP ranges of port number allocations for each of the plurality of MSCs;

updating the database to indicate the selection, wherein the updating is performed periodically to respond to changes in MSC port-allocations;

inspecting a UDP port number in a header of the media packet;

comparing the port number with MSC-port allocations in the database;

selecting, based on the comparison, an MSC from the plurality of MSCs;

forwarding the media packet to the selected MSC;

updating, by the selected MSC, a destination address of the media packet to a known IP address for the destination address; and forwarding, by the selected MSC, the media packet to a backend router.

7. The network device according to claim 6, further comprising an external network interface, wherein the packet is received at the external network interface and from an upstream router.

8. The network device according to claim 6, wherein the port number is a UDP destination port number.

9. The network device according to claim 6, wherein the selecting further comprises:

mapping the port number to a virtual IP address of the selected MSC from the database; wherein forwarding the packet to the selected MSC comprises forwarding the packet to the virtual IP address.

10. The network device according to claim 6, wherein forwarding the packet to the selected MSC further comprises encapsulating the packet in a Virtual Extensible LAN (VXLAN) packet.

11. The network device according to claim 10, wherein encapsulating the packet in the VXLAN packet further comprises:

overwriting a destination MAC address in an ethernet header of the packet with a MAC address of the selected MSC.

12. The network device according to claim 6, wherein the packet is a media packet of a media traffic flow.

13. The network device according to claim 6, wherein the MSC-port allocations in the database associate each MSC with a unique range of media port numbers.

14. The network device according to claim 6, further comprising a management interface, and wherein the database is updated through the management interface.

15. The network device according to claim 6 further comprising an internal network interface, and wherein the packet is forwarded to the selected MSC through the internal network interface.

16. A system comprising:

one or more network devices, wherein each network device comprises a processor and a memory, wherein the memory comprises instructions which when executed by the processor cause the one or more network devices to allocate a packet to a Media Session Controller (MSC) by:

receiving a media packet for a media session;

inspecting a UDP port number in a header of the media packet;

comparing the port number with MSC-port allocations a database;

selecting, based on the comparison, an MSC from a plurality of MSCs;

forwarding the media packet to the selected MSC;

updating, by the selected MSC, a destination address of the media packet to a known IP address for the destination address;

forwarding, by the selected MSC, the media packet to a backend router;

one or more MSCs, wherein each of the MSCs is assigned a unique range of port numbers; and a controller configured to:

prior to receiving the packet at the network device, select an MSC to receive the packet based on current loads;

communicate a port number associated with the selected MSC and an IP address, wherein the port number associated with the selected MSC is determined from the MSC-port allocations in the database; and update the database to indicate the selection of the MSC, wherein the updating is performed periodically to respond to changes in MSC port-allocations.

17. The system according to claim 16, further comprising a router configured to receive the packet from a user device and forward the packet to a network device of the one or more network devices.

18. The system according to claim 17, wherein the router uses Equal Cost Multipath Routing (ECMP) to route the packet to one of the one or more network devices.

19. The system according to claim 16, wherein the MSC is selected based at least one or more of performance data, an operating status, or a load.

20. The system according to claim 16, wherein the packet forms part of a media session flow and the same MSC is selected for all packets in the same media session flow.

\* \* \* \* \*